United States Patent [19]

Platt

[11] Patent Number: 4,769,876
[45] Date of Patent: Sep. 13, 1988

[54] WIRE SEPARATOR STRUCTURE AND METHOD

[76] Inventor: Richard B. Platt, 381 Country Club La., Detroit, Mich. 48236

[21] Appl. No.: 19,361

[22] Filed: Feb. 26, 1987

[51] Int. Cl.⁴ ............................................. F16L 3/22
[52] U.S. Cl. ...................................... 24/459; 24/335; 248/68.1
[58] Field of Search ................. 24/459, 460, 461, 462, 24/335, 17 R, 16 R; 248/68.1; 312/111; 174/135

[56] References Cited

U.S. PATENT DOCUMENTS

| | | | |
|---|---|---|---|
| 2,404,531 | 7/1946 | Robertson | 248/68.1 |
| 2,425,935 | 8/1947 | Hayman | 24/335 |
| 3,023,989 | 3/1962 | White | 24/335 |
| 3,050,578 | 8/1962 | Huebner | 24/335 |
| 3,526,934 | 9/1970 | Owen, Sr. | 248/68.1 |
| 3,563,624 | 2/1971 | Stice | 312/111 |
| 3,814,489 | 6/1974 | Clark et al. | 312/111 |
| 3,894,706 | 7/1975 | Mizusawa | 248/68.1 |
| 4,024,604 | 5/1977 | Klimek et al. | 24/16 R |
| 4,030,540 | 6/1977 | Roma | 248/68.1 |
| 4,148,113 | 4/1979 | Dvorachek | 24/335 |

FOREIGN PATENT DOCUMENTS 1350571 4/1974 United Kingdom .................. 24/459

Primary Examiner—Victor N. Sakran
Attorney, Agent, or Firm—Dale R. Small

[57] ABSTRACT

Wire separator structure and method for separating spark plug wires and the like. The structure includes a body member having a plurality of cylindrical openings therethrough including parallel transversely spaced apart axes of generation in the same plane, and a slot extending across the plane and parallel to the cylindrical openings have dovetail portions on both sides of the plane which body member is split in the plane of the axes of the cylindrical openings therethrough to provide separate body parts and a generally X-shaped wedge member positioned within the slot in the body member to hold the parts of the body member together with the wires to be separated within the cylindrical openings in the body member. In the method of the invention, wires to be separated are placed in cylindrical openings in a split body member and the parts of the split body member are secured together by an X-shaped wedge member extending axially of the cylindrical openings into dovetail slots in the body parts.

14 Claims, 1 Drawing Sheet

U.S. Patent  Sep. 13, 1988  4,769,876
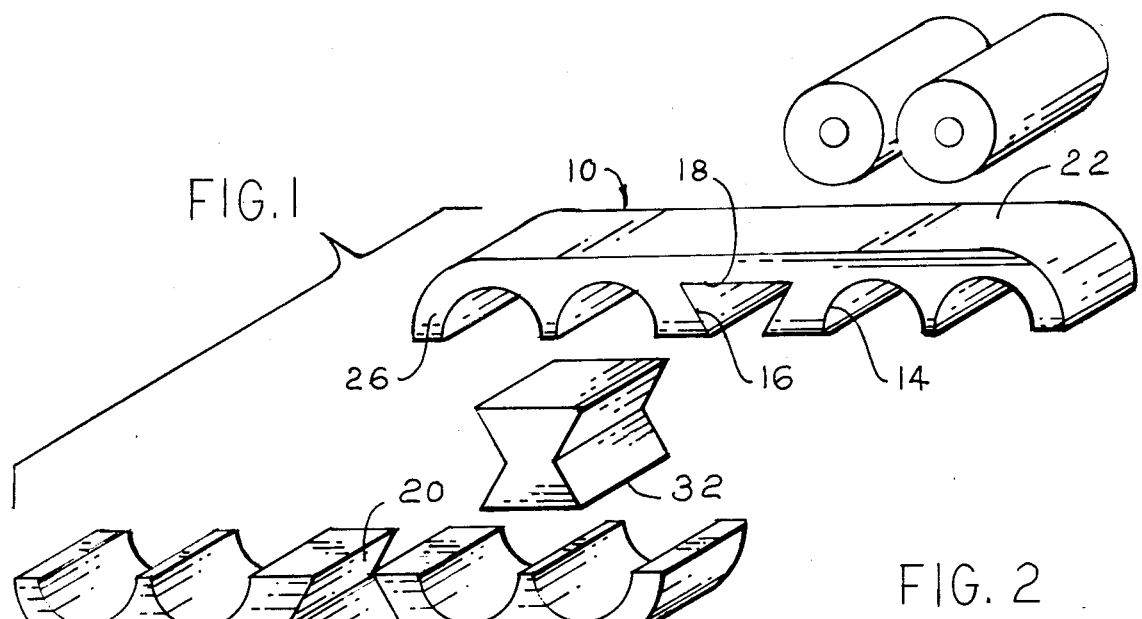
FIG. 1
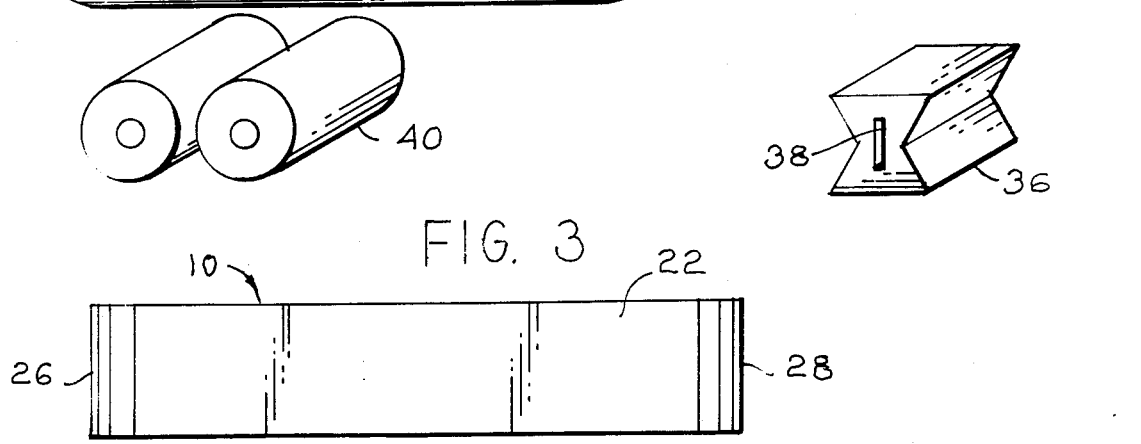
FIG. 2
FIG. 3
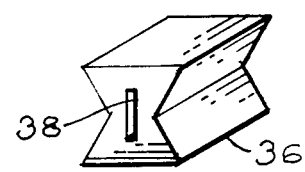
FIG. 4
FIG. 5
FIG. 6
FIG. 7

4,769,876

WIRE SEPARATOR STRUCTURE AND METHOD

BACKGROUND OF THE INVENTION

1. Field of the Invention

This invention relates to wire separators and refers more specifically to structure for and a method of separating wires, such as automobile spark plug wires, including a body part having a plurality of parallel, transversely spaced apart openings therethrough split into two parts on the axes of generation of the openings therethrough for receiving the wires to be separated and held together in assembly with the wires by a wedge member positioned in a slot in the body member extending between the two parts thereof, and the method of separating wires with such structure.

2. Description of the Prior Art

In the past, separators for cylindrical members such as wires, cables, tubing and the like have often included a body member split centrally along the axes of parallel, transversely spaced apart cylindrical openings therethrough receiving the cylindrical members to be separated, which body parts are secured together by nut and bolt structure passing through the body parts between the separated members. Such structure is unsightly and requires securing the nut and bolt together while holding the members to be separated in assembly with the two separate body parts. Such assembly often results in dropping of a nut or bolt or one of the body parts. Alternatively, assembly of such structure is facilitated by utilizing two pairs of hands, one to hold the body parts together and the other to assemble the nut and bolt. Such prior structure is generally shown in U.S. Pat. Nos. 2,425,935, and 3,023,989.

Alternatively, the body parts of prior separators for wires, pipes and the like have sometimes been split separately, longitudinally on the axes of openings therethrough in which the members to be separated are to be positioned and provided with flanges through which a clamping bolt and nut is extended transversely of the members to be separated. One such structure is shown in U.S. Pat. No. 4,148,113. Such structure is relatively complicated in configuration and therefore more difficult than necessary to produce, and has the same defects as the prior structure mentioned above, in that assembly requires holding the body member with the members to be separated positioned therein and securing them together with a nut and bolt. Again, such structure is not pleasing to the eye.

Also, as shown in U.S. Pat. No. 3,050,578, the body member utilized to separate structures such as spark plug wires is sometimes constructed of flexible material and is folded over the members to be separated, which are positioned between studs or the like extending from one part of the body member, and the folded portion of the body member is secured in place by a locking mechanism.

Sometimes these last two methods of separating wires or similar cylindrical members have been combined, as shown in U.S. Pat. No. 4,024,604 wherein the body member is folded over the members to be separated and is secured together by a screw extending through flanges on the body member.

All such prior structures are unsightly, and are not easy to install, particularly when utilized to separate structure such as spark plug wires, the installation of which may take place under the hood of an automobile where space is at a premium, the wires to be separated are not readily accessible, lighting may be bad, and dropping of one of the parts of the wire separator structure may cause loss of or at least difficulty in retrieving the part dropped.

SUMMARY OF THE INVENTION

The invention is a unique structure for and method of separating elongated cylindrical members and in particular spark plug wires utilized in conjunction with internal combustion engines.

The structure of the invention includes a body member having a plurality of parallel, transversely spaced apart openings having axes of generation in the same plane, extending therethrough for receiving the members to be separated which body member is split into two parts in the plane of the axes of the openings therethrough in a preferred embodiment to permit placing of the members to be separated in the openings. The body member also includes a slot extending therethrough, parallel to the openings therethrough, including dovetail portions in both parts thereof and a wedge having a cross section including similar dovetail portions adapted to be secured in the slot in the body parts for securing the body parts together with the wires separated thereby.

Further in accordance with the invention, the wedge member may be slightly smaller than the slot at one end thereof to facilitate insertion of the wedge member in the slot, and the wedge ember may include a rectangular recess on one end thereof to facilitate installation of the wedge member in position in the slot in the body member with a tool such as a screw driver inserted in the recess.

The body member may have two, three, four, or more openings extending therethrough is accordance with the number of members to be separated.

In accordance with the method of the invention, members to be saparated are positioned in openings extending through a body member split on the axes of the openings therethrough and the body member parts secured together by placing a wedge member in wedge-shaped slots in the body member parts.

BRIEF DESCRIPTION OF THE DRAWINGS

FIG. 1 is an exploded perspective view of the wire separator structure of the invention for practicing the method of the invention and showing wires in conjunction therewith.

FIG. 2 is a perspective view of a modification of the wedge member illustrated in FIG. 1.

FIG. 3 is a top view of the wire separator structure illustrated in FIG. 4, taken in the direction of arrow 3 in FIG. 4.

FIG. 4 is an end view of the wire separator structure illustrated in FIG. 1.

FIG. 5 is a side view of the wire separator structure illustrated in FIG. 4, taken in the direction of arrow 5 in FIG. 4.

FIG. 6 is an end view of a modification of the wire separator structure illustrated in FIGS. 1 and 3–5.

FIG. 7 is an end view of still another modification of the wire separator structure illustrated in FIGS. 1 and 3–5.

DESCRIPTION OF THE PREFERRED EMBODIMENT

The wire separator 10 illustrated in FIG. 1 includes a body member 12 having a plurality of cylindrical openings 14 extending therethrough with their axes of generation being parallel and in transverse spaced relation in the same plane.

A slot 16 also extends through the body member 12 between, in parallel with, and in transverse spaced relation to the cylindrical openings 14. As shown best in FIG. 4, the slot 16 has a cross section including two dovetail portions 18 and 20 on opposite sides of the plane defined by the axes of generation of the cylindrical openings 14.

Body member 12 is split centrally on the plane defined by the axes of generation of the cylindrical openings 14 therethrough to provide separate body parts 22 and 24. In addition, as shown best in FIG. 4, the sides 26 and 28 of the body member 12 are semi-cylindrical.

A wedge member 30, shown best in FIG. 1, having the X-shaped cross section shown including the dovetail portions 32 and 34, is positioned in the slot 16 in the body member 12 to secure the body parts 22 and 24 together in assembly.

The wedge member 30 in a preferred embodiment is constructed of softer material, such as plastic, and may in fact be nylon, while the body member 12 is constructed of harder material, such as metal, and may in fact be aluminum, whereby on assembly the wedge member 30 may be slightly deformed to provide a bias between the wedge member and body member to hold them together more securely.

In use, the wire separator 10 is separated into its component parts as shown best in the exploded view in FIG. 1. The wires such as automobile spark plug wires 40 are placed in the semi-cylindrical recesses in one part of the body member 12 and the other part of the body member 12 is positioned over the wires and the body parts 22 and 24 are firmly gripped to hold the wires in their separated positions while the wedge member 30 is inserted into the slot 20 to lock the body parts 22 and 24 together with the wires 40 maintained in the desired separated position.

To aid in the invention of the wedge member 30 into the slot 20, one end of the wedge member 30 may be slightly smaller than the rest of the wedge member 30.

Thus, the wires 40 are maintained in a separated position as desired by the particularly simple, economical and efficient wire separator structure 10 of the invention.

Further, the wire spreader structure 10 of the invention is aesthetically pleasing in form and may be constructed of stainless steel, chrome-plated material or colored material, such as aluminum, so as to be pleasing to the eye.

While one embodiment of the invention and a modification thereof have been considered in detail, it will be understood that other embodiments and modifications are contemplated.

Thus, as shown best in FIGS. 6 and 7, the modifications 42 and 44 of the separator 10 of the invention include three and two cylindrical openings therethrough respectively.

It is the intention to include all embodiments and modifications as are defined by the appended claims within the scope of the invention.

I claim:

1. A wire separator for separating automobile ignition wires comprising a body member having a plurality of parallel transversely spaced apart cylindrical openings therethrough positioned substantially centrally between the top and bottom of the body member which body member is split transversely substantially midway between the top and bottom thereof on the axes of generation of the cylindrical openings therethrough to provide top and bottom body parts, aligned dovetail slots in the body parts between a pair of openings therein and extending axially thereof in parallel spaced apart relation thereto and a separate wedge member having two complementary dovetail portions forming a generally X-shaped wedge member cross section positioned within the slots in the body parts for holding the body parts together.

2. Structure as set forth in claim 1 wherein the dovetail cross section portion of the wedge member is slightly larger than the dovetail cross section portion of the slot in the body member whereby the wedge member must be slightly deformed to place it in the dovetail slot in the body member.

3. Structure as set forth in claim 1 and further including a longitudinally extending rectangular recess in the end of the wedge member to facilitate assembly of the wedge member with the body member.

4. Structure as set forth in claim 1 wherein the body member is metal and the wedge member is plastic.

5. Structure as set forth in claim 1 wherein there are four openings extending through the body member.

6. Structure as set forth in claim 1 wherein there are three openings extending through the body member.

7. Structure as set forth in claim 1 wherein there are two openings extending through the body member.

8. Structure as set forth in claim 1 wherein one end of the wedge member is slightly smaller than the slot in the body member to facilitate insertion of the wedge member into the slot in assembly of the body member.

9. Structure as set forth in claim 1 wherein the body member is constructed of a relatively hard material and the wedge member is constructed of a relatively soft material.

10. The method of separating wires comprising providing a body member having a plurality of transversely spaced apart parallel openings therethrough splitting the body member through the openings to provide two body parts, placing aligned dovetail slots in each of the body parts parallel and in spaced relation to the openings therein, placing the wires to be separated in the openings and placing a wedge having a cross section complementary to the cross section of the aligned slots in the aligned slots in the body parts by slipping it longitudinally into the slots to secure the body parts together with the wires separated in the openings.

11. The method as set forth in claim 10 and further including deforming the wedge in placing it in the slots to more securely fasten the body parts together.

12. The method as set forth in claim 11 and further including placing a rectangular recess in one end of the wedge to facilitate assembly of the wedge with the body parts.

13. The method as set forth in claim 10 and further including making the wedge slightly larger in cross section than the dovetail slots, and slightly deforming the wedge member to place it in the dovetail slots in the body member.

14. A wire separator for separating automobile ignition wires comprising a body member having a plurality of parallel transversely spaced apart cylindrical openings therethrough positioned substantially centrally between the top and bottom of the body member, which body member is constructed of a relatively hard material and is split transveresly substantially midway between the top and bottom thereof on the axis of generation of the cylindrical openings therethrough to provide top and bottom body parts, aligned dovetail slots in the body parts between a pair of openings therein and extending axially thereof in parallel spaced apart relation thereto and a separate wedge member constructed of a relatively soft material having two complementary dovetail portions forming a generally X-shaped wedge member cross section which is slightly larger than the dovetail cross section portion of the slots in the body member whereby the wedge member must be slightly deformed to place it in the dovetail slot in the body member for holding the body parts together which wedge member includes one end slightly smaller than the slots in the body member to facilitate insertion of the wedge member into the slot in assembly of the body member with the wedge member.

* * * * *